R. A. BACHMAN AND C. W. NORTON.
SAFETY DEVICE.
APPLICATION FILED APR. 21, 1917.

1,331,795.  Patented Feb. 24, 1920.

Witnesses:
N. L. Fisher.
William A. Hardy.

Inventors
Robert A. Bachman
Charles W. Norton

UNITED STATES PATENT OFFICE.

ROBERT A. BACHMAN, OF EAST ORANGE, AND CHARLES W. NORTON, OF WEST ORANGE, NEW JERSEY, ASSIGNORS TO EDISON STORAGE BATTERY COMPANY, OF WEST ORANGE, NEW JERSEY, A CORPORATION OF NEW JERSEY.

SAFETY DEVICE.

1,331,795.  Specification of Letters Patent.  Patented Feb. 24, 1920.

Application filed April 21, 1917. Serial No. 163,571.

*To all whom it may concern:*

Be it known that we, ROBERT A. BACHMAN, a citizen of the United States, and a resident of East Orange, Essex county, New Jersey, and CHARLES W. NORTON, a citizen of the United States, and a resident of West Orange, Essex county, New Jersey, have invented certain new and useful Improvements in Safety Devices, of which the following is a description.

Our invention relates to safety devices and more especially to safety devices for secondary cells or batteries, being in some aspects an improvement on the inventions disclosed in patents of Miller Reese Hutchison No. 1,116,893, dated Nov. 10, 1914, entitled Safety device for secondary cells, and No. 1,130,977, dated March 9, 1915, and entitled Safety device.

The principal object of our invention is to provide an improved and simple safety device for storage battery cells, whereby the gases given off by a cell will be more effectively and thoroughly washed and the potash or other substances which are ordinarily carried away by these gases will be removed, and which will prevent any explosion of gas within the cell from getting out and any impurities or external flame from reaching the interior of the cell.

Another object of the invention is to provide an improved construction whereby the electrolyte in the cell may be replenished, partly at least, through the safety device so as to carry back to the cell the potash or other material which has been removed by the safety device from the gases given off by the cell in their passage through the said device.

Other objects and features of our invention reside in the details of construction and combinations of elements hereinafter more specifically described and claimed.

Figure 1:
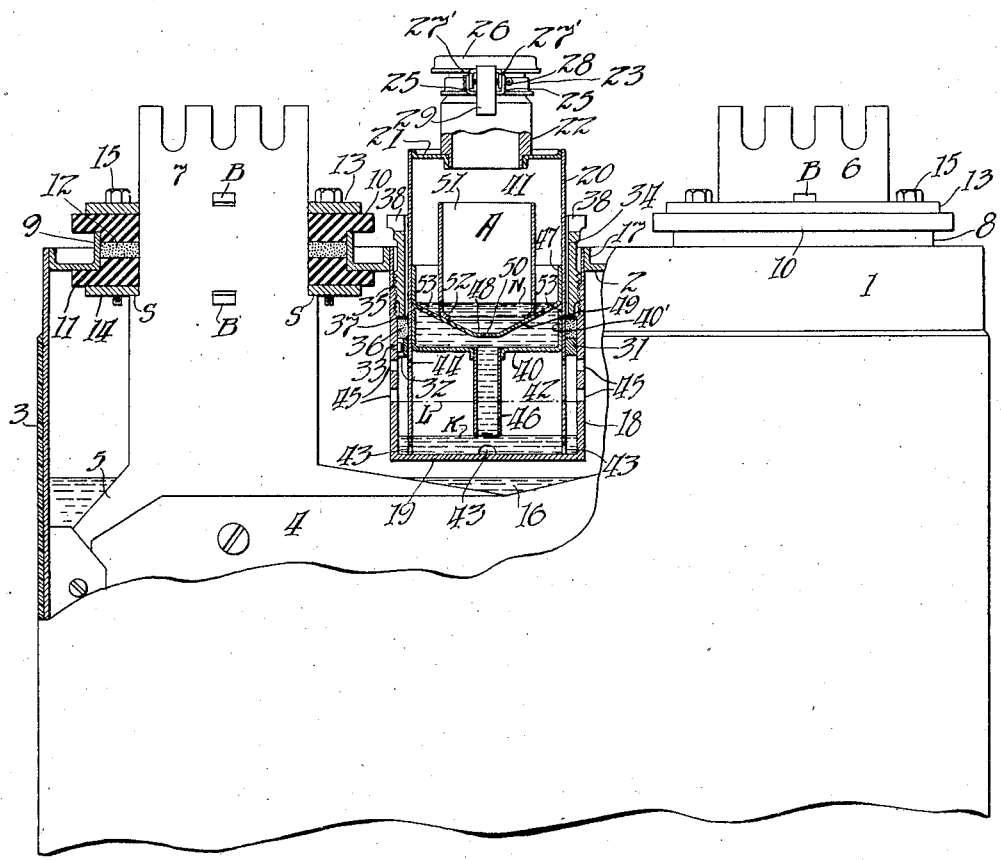
Figure 2:
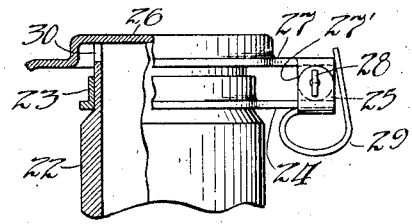

In order that our invention may be more clearly understood, attention is directed to the accompanying drawing forming part of this specification and in which:

Figure 1 is an elevational view, partly in section, of the upper end portion of a storage battery of the Edison type having applied thereto a safety device in accordance with our invention; and Fig. 2 is a detail elevational view of the upper end portion of the safety device shown in Fig. 1, looking from the left in Fig. 1.

Referring to the drawing, reference character 1 represents the container or can of a storage battery cell of the Edison type such as is designed for use in submarines or other electrical power driven boats, vehicles or machines. The container 1 is provided with a top 2 preferably disposed within and welded to the upper end portion of the side and end walls of the container, as is customary. A coating 3 of semi-hard rubber is preferably vulcanized onto the outer surfaces of the walls of the container 1 and preferably terminates a short distance from the upper end of the said container. Reference characters 4 and 5 represent the battery plates or elements which are mounted within the container and insulated from each other in any suitable manner. Each of the plates 4 of one polarity is provided with an upwardly extending portion or pole piece 6 at one side thereof, and each of the plates 5 of the opposite polarity is provided with a similar portion or pole piece 7 at the other side, the portions 6 and 7 respectively extending above the container 1 through suitable stuffing boxes 8 and 9 provided in the top 2 adjacent the opposite ends of the cell. Each of the stuffing boxes 8 and 9 comprises upper and lower members or plate 10 and 11, preferably formed of hard rubber, a member 12 of resilient material, such as soft rubber, disposed between the members 10 and 11, an upper steel plate 13, and a lower steel plate 14. The members 10, 11, 12, 13 and 14 of each stuffing box are provided with suitable apertures or slots for the respective plate portions or pole pieces 6 or 7, and are secured firmly together as by bolts 15, the latter being tightened so as to compress the resilient member 12 and expand the same laterally into fluid tight engagement with the portions or pole pieces 6 or 7. The construction of the stuffing boxes is preferably such as disclosed in patent No. 1,204,481 granted to Charles W. Norton on Nov. 14, 1916 and entitled, Secondary or storage battery.

The plates 4 and 5 are firmly secured to the stuffing boxes 8 and 9 and thereby to the top 2 of the container for convenience in assembling, by pins or keys B driven through openings respectively provided therefor in the portions or pole pieces 6 and 7 just above and below the upper and lower plates 13 and 14 of the stuffing boxes. The portions 6 and 7 are also provided with shoulders S adapted to engage the lower surfaces of the plates 14. The construction just described prevents buckling of the upper and lower plates 13 and 14 when the bolts 15 are tightened. The electrolyte within the container 1 is designated by reference character 16.

In addition to the usual filling opening (not shown), the top 2 of the container is provided with an opening, preferably midway between the stuffing boxes 8 and 9, for our improved safety device, this opening being surrounded by an upstanding flange 17. Reference character 18 represents a cylindrical casing for the safety device or trap A, which casing is preferably permanently secured within the cell as by welding the upper end portion thereof to the flange 17. The upper end of the casing 18 is open but its lower end is closed by a bottom 19 preferably formed integrally therewith and disposed a slight distance above the normal level of the electrolyte 16. The safety device A comprises an outer long cylindrical steel shell 20, which is open at the bottom but which is provided with a top 21 welded within the upper end thereof. The shell 20 is somewhat less in diameter than the inside diameter of the casing 18 within which it is disposed and is firmly but removably held in place in a manner which will be hereinafter described. The top 21 of the shell 20 is provided with a flanged opening within which is secured, preferably by welding, a short tubular member 22. The upper end portion of member 22 is reduced and provided with a collar 23 rigidly secured thereto, which collar is provided with a lateral extension 24 having upturned lugs 25. The lid or cover 26 for the upper open end of the tubular member 22 is provided with an extension 27 having lugs 27' received between the lugs 25 and pivoted thereto as by a pin 28. A spring 29 is secured at one end to the extension 24 of collar 23 and is formed with a loop, the free end of the spring pressing against the outer edge of the extension 27 when the cover 26 is closed, to hold the lid or cover in that position. When the cover is opened, however, the free end of the spring 29 slides around the extension 27 and presses against the top thereof to hold the cover in open position. The upper edge of the tubular member 22 is provided with a plurality of recesses or notches 30, only one of which is shown, which establish free communication between the interior of the safety device A and the outside atmosphere when the cover 26 is closed. The cover 26 prevents the entrance of dirt or other impurities into the safety device A.

The shell 20 has an outer collar 31 secured thereto, as by welding, which is provided with a notch or recess 32 adapted to register with and receive the inwardly extending head of a pin 33 secured to the wall of the casing 18, when the safety device A is properly positioned within said casing as shown in Fig. 1. When so positioned, the device is firmly but removably secured in place by means of a ring or sleeve 34 having screw threaded engagement with the interior of casing 18, as shown at 35. A rubber gasket or washer 36 is disposed just above the collar 31 and a steel ring or washer 37 is placed between the rubber gasket 36 and the lower end of the sleeve 34. The upper end portion of the sleeve 34 is provided with a pair of opposed notches 38 for engagement by a spanner or other suitable tool to facilitate the turning of the sleeve in removing or applying the safety device to the cell. When the sleeve or ring 34 is screwed down, the gasket 36 is compressed and forms a fluid tight joint between the casing 18 and shell 20, and the lower end of the shell 20 is forced tightly against the bottom 19 of the casing 18. The presence of the washer 37 prevents the rubber gasket 36 from being twisted and distorted by the lower end of the sleeve 34 when the latter is tightened. By this construction it will be apparent that the safety device may be readily removed from the cell when desired to permit cleaning thereof and the interior of the casing 18, or for any other reason. It will also be apparent that the provision of the slot or notch 32 in the ring 31 and the pin 33 on the casing 18, insures that the safety device will always be applied to the cell in the same position relative thereto. This is an important feature as the cover 26 is pivoted to the tubular member 22 so that when the same is opened with the safety device A secured to the cell in proper position, the same will swing in a path parallel to and between the poles of the cell formed of the pole pieces 6 and 7, and consequently, all danger of the cover 26 contacting the poles of the cells or the connections thereto on the opening of the cover, which would effect the short circuiting of the cell or the battery in which the cell might be located, is eliminated.

When the safety device A is secured within casing 18, as shown in Fig. 1, the bottom 19 of this casing also forms the bottom of the safety device. The shell 20 of the safety device is provided with a horizontal partition 40 dividing the shell 20 into two compartments 41 and 42 and having a flange 40' secured to the inner surface of the shell, as by welding. Communication is established between the lower compartment 42 and the annular space between the shell 20 and casing 18 below the collar 31, by means of a plurality of notches or recesses 43, formed in the lower end portion of the shell 20 and also by a plurality of peripherally arranged holes 44 provided in the shell 20 just below the partition 40 and the collar 31. The casing 18 is also provided a short distance below the pin 33, with a plurality of peripherally arranged openings 45, whereby communication is established between the interior of the cell above the level of the electrolyte 16 and the annular space formed between the portions of casing 18 and shell 20 below the collar 31.

A small vertical tube 46 is secured at its upper end, as by welding, in an opening located centrally of the partition 40 and terminates at its lower end a short distance above the notches 43 in the lower end of the shell 20. The tube 46 serves to establish communication between the chambers 41 and 42. Reference character 47 represents a short tubular member which fits closely within and is suitably secured, as by welding, to the shell 20 just above the flange 40′ of partition 40. The member 47 is provided with a bottom comprising a flat small central circular portion 48 disposed just above the upper end of tube 46, and an annular portion 49 inclining upwardly from said central portion 48. The small flat central portion 48 of the bottom of member 47 is provided with a very small centrally located opening 50. Reference character 51 represents a vertically disposed open-ended tubular member, preferably slightly larger in diameter than the opening in the top 21 of the shell 20 within which the member 22 is secured. The lower end of the member 51 is provided with a flange 52 which is suitably secured as by welding, to the inclined portion 49 of the bottom of the member 47, and serves to hold the member 51 concentrically within the shell 20 so as to provide an annular space between the latter and the member 51. The annular portion of the bottom of member 47 about the tubular member 51 is provided with a series of fairly large openings 53 to establish communication between the portions of chamber 41 above and below the bottom of member 47. The upper open end of the tubular member 51 terminates a short distance below the top 21 of shell 20.

The safety device constructed as shown and described herein is very effective in operation, insuring a much more thorough washing of the gases which escape from the cell when the latter is gassing, and preventing any appreciable depletion of the liquid therein when a partial vacuum is created within the container 1 of the cell. Moreover, the passage of flame through the safety device to the interior of the cell upon an external explosion or to the exterior of the cell upon an internal explosion is effectively prevented by the construction employed.

When the cell is in such a condition that the pressure within the same above the level of the electrolyte 16 is equal to the atmospheric pressure, the liquid within the safety device will normally be at the level L (Fig. 1) or at the level of the bottom of the lower openings 45. Should a partial vacuum now be created within the container 1, but a very small amount of the liquid in the safety device, viz., an amount equal to the volume of that portion of tube 46 between the level L and the lower end of such tube, will be forced therefrom into the container 1 by the pressure of the atmosphere outside the cell. In such event, the air from outside the cell will enter the tubular member 22 of the safety device through the notches or recesses 30 in the upper end of the latter, then pass through the opening 50 and openings 53 into the tube 46 and force the liquid from the lower end portion of the latter into chamber 42 from whence a like amount will accordingly be discharged through notches 43 into the annular space between casing 18 and shell 20 and from this annular space through openings 45 into the interior of the container 1. All of the liquid having now been forced out of the tube 46, air from outside the cell will bubble up from the lower end of tube 46 through the liquid surrounding said tube into the portion of chamber 42 above the level L of the liquid from whence it will pass through openings 44 and 45 into the interior of container 1, to relieve the vacuum therein, whereupon the liquid in the safety device will again assume the same level in casing 18, chamber 42 and tube 46, which level will be but slightly below the level L, owing to the very small amount of liquid expelled from the safety device. Should a partial vacuum again be created within the container 1, before the liquid in the safety device is replenished, it will be apparent that no more liquid will be discharged from the safety device on the passage of air therethrough from outside the cell, in the manner just described, to relieve such vacuum.

With the liquid in the safety device at the normal level L, should the cell commence to gas upon the discharging or charging thereof, the action is as follows: Gas from within the container 1 enters the safety device A through the openings 45 and 44 and forces the liquid in chamber 42 and the annular space between the lower end portion of shell 20 and casing 18 from the level L down to the level K at the lower end of tube 46. This causes the liquid to rise in the tube 46 and into the chamber 41 of shell 20 through the openings 50 and 53 to the level N. The liquid now stands in the safety device as shown in Fig. 1, and the gas from inside the container will pass therefrom to the outside as follows:

Through openings 45 and 44 into chamber 42, from chamber 42 down around the lower end of tube 46, up through the liquid in tube 46 and chamber 41 and through the large openings 53 in the bottom of member 47 and the liquid in the annular space between members 51 and 20, and then from said annular space, above the level N of the liquid therein, through the tubular member 22 and the notches 30 in the upper end thereof to the outside atmosphere. Owing to the presence of the small tube 46, when the cell is gassing, the "head" of liquid between the inlet and outlet of the safety device will be considerably greater than the normal "head" of the liquid in the safety device between the inlet and outlet of the latter, being increased by an amount equal to the difference between the distance from level N to level L and the distance from lever L to level K. Accordingly, the gas in escaping from the cell container 1 will pass through a much greater "head" of liquid than in similar devices of this character heretofore employed, and will therefore be much more thoroughly washed to thereby remove therefrom the solid matter, such as potash or other substances. This is a very important feature of our invention, as it is very desirable to remove from the escaping gases all conducting substances and solid material.

The gas in passing from the container through the safety device is compelled to take a still longer and a tortuous path through the liquid and accordingly will be still more thoroughly washed due to the smallness of hole 50, and the presence of members 47 and 51 which serve as baffles. Most of the gas will pass through openings 53 and up around the tubular member 51 before passing out through member 22 and accordingly will strike against the annular portion of cover 21 about the opening in which member 22 is secured. A considerable amount of the liquid in the gas is thus removed and drops back into the main body of the liquid in the safety device. The cover 26 also assists in this action of removing the liquid from the escaping gases. Owing the openings 50 and 53 the liquid within member 51 and within that portion of shell 20 surrounding member 51 will be constantly maintained at the same level. The small perforation 50 in the center of the bottom of member 47 also permits the liquid within member 51 to drain therefrom to a lower level in the safety device.

Should an explosion occur within the cell, it will be evident that but very little, if any, of the liquid within the safety device will be expelled to the outside, due to, among other features, the employment and arrangement of the small tube 46, the baffles comprising members 47 and 51, the small opening 50, and the cover 26.

While we have shown and specifically described a preferred embodiment of our invention, it is to be understood that the same is subject to many modifications and changes in the size, form and arrangement of its parts without any departure from the spirit of the invention and the scope of the appended claims.

Having now described our invention, what we claim and desire to protect by Letters Patent, is as follows:

1. A safety device for storage batteries and the like, comprising a liquid containing vessel provided with a partition above the normal level of the liquid therein dividing the same into upper and lower compartments, the lower compartment having an inlet above the normal level of said liquid and the upper compartment having an outlet, and a vertically disposed open ended tubular member establishing communication between said compartments, the lower end of said member terminating below the normal level of the liquid in the lower compartment, and said member being so arranged that the liquid must be raised to a level above said partition before the gas can pass through the device to said outlet, substantially as described.

2. A safety device for storage batteries and the like, comprising a liquid containing vessel provided with a partition above the normal level of the liquid therein dividing the same into upper and lower compartments, the lower compartment having an inlet above the normal level of said liquid and the upper compartment having an outlet, and a vertically disposed open-ended tubular member of small cross section as compared with said vessel secured at its upper end to said partition and comprising the sole means of communication between said compartments, the lower end of said member terminating below the normal level of the liquid in the lower compartment, and said member being so arranged that the liquid must be raised to a level above said partition before the gas can pass through the device to said outlet, substantially as described.

3. A safety device for storage batteries and the like, comprising a fluid containing vessel provided with a partition above the normal level of the fluid therein dividing the same into upper and lower compartments, the lower compartment having an inlet above the normal level of said fluid and the upper compartment having an outlet, a vertically disposed open ended tubular member establishing communication between said compartments, the lower end of said member terminating below the normal level of the fluid in the lower compartment, and means causing the gas passing through said vessel to take a tortuous path in the upper compartment, substantially as described.

4. A safety device for storage batteries and the like, comprising a liquid containing vessel having an inlet and an outlet above the normal level of liquid therein, means whereby gas in passing from said inlet to the outlet is caused to pass through said liquid and to raise the level of said liquid to a point above the normal level thereof, and means for causing said gas in passing through the device to said outlet to take a tortuous passage in the portion of said liquid which is raised above said normal level, substantially as described.

5. A safety device for storage batteries and the like, comprising a liquid containing vessel having an inlet and an outlet above the normal level of liquid therein, means whereby gas in passing from the inlet to the outlet is caused to pass through said liquid and to raise the level of the liquid to a point above the normal level thereof, and means whereby the gas in the normal gassing operation of the storage battery or the like is caused to take a path through the liquid longer than the path the gas would take due to the presence of said first means, substantially as described.

6. A safety device for storage batteries and the like, comprising a liquid containing vessel having an inlet and an outlet above the normal level of liquid therein, means whereby gas passing from the inlet to the outlet in the normal gassing operation of the storage battery or the like is caused to pass through said liquid, and baffle means located in the path of said gas and below the level to which said liquid must be raised before the gas can pass through the device to said outlet, substantially as described.

7. A safety device for storage batteries and the like, comprising a liquid containing vessel having an inlet and an outlet above the normal level of the liquid therein, means whereby gas in passing from said inlet to the outlet is caused to pass through said liquid and to raise the level of the liquid to a point above the normal level thereof, and means comprising a hollow shell or casing whereby said gas in the normal gassing operation of the storage battery or the like is caused to pass to said outlet in an indirect path through the portion of said liquid which is raised above said normal level, substantially as described.

8. A safety device for storage batteries and the like, comprising a fluid containing vessel having an inlet and an outlet above the normal level of the fluid therein, means causing gas passing from the inlet to the outlet to pass through said fluid, a baffle member extending transversely of said vessel located in the path of the gas between the inlet and the outlet, and a tubular member carried by and extending upwardly from said baffle member, the upper end of said tubular member being open and terminating below the top of said vessel, said baffle member being provided with a small aperture within and with a comparatively large aperture or apertures without said tubular member, substantially as described.

9. In a storage battery, the combination with the container thereof, of a safety device for controlling the escape of gas from and the admission of gas to said container, said safety device being removably applied to said container, and means for insuring the application of said device to said container always in the same position relative thereto, substantially as described.

10. In a storage battery cell, a fluid containing casing secured to the top of the battery container and extending within the latter, and a tubular member of less cross-sectional area than said casing removably disposed within and dividing said casing into two fluid containing compartments communicating adjacent the bottom of the casing, said casing being provided with means establishing communication between the interior of the battery cell and one of said compartments above the normal level of the fluid therein, and the other compartment being provided with an outlet above the normal level of the fluid therein, substantially as described.

This specification signed this 17th day of April, 1917.

ROBERT A. BACHMAN.
CHARLES W. NORTON.